:::

3,133,092
STABILIZATION OF EPOXYPOLYBUTADIENES WITH HYDROQUINONE
Gene Nowlin and Murray H. Reich, Princeton, N.J., assignors to FMC Corporation, a corporation of Delaware
No Drawing. Filed Mar. 15, 1961, Ser. No. 95,796
4 Claims. (Cl. 260—348)

This invention relates to the stabilization of epoxypolybutadienes. More particularly, it relates to a method of reducing the peroxygen content of epoxypolybutadienes.

Epoxypolybutadienes are clear, viscous resins which may be cured to useful thermoset products having excellent electrical and mechanical properties. These resins are useful for encapsulating, casting, tooling, laminating, adhesive applications, and coating.

One of the problems which has been encountered in the use of epoxypolybutadienes is that batches of the product have varying degrees of viscosity stability. When an epoxypolybutadiene is blended with a typical curing system such as maleic anhydride and propylene glycol, the ingredients are first heated to reduce their viscosity. In many cases, a large batch of epoxypolybutadiene is heated, and the amount of resin desired for use in the blend is removed from the batch of heated resin. As a result, the heated epoxypolybutadiene which is not immediately used tends to increase in viscosity at a rate which depends upon its degree of instability and the length of time it was held at the elevated temperature. In some cases the viscosity will increase to an unworkable level within a relatively short period of time, and the remainder of the batch will be lost.

The stability problem becomes more serious when the epoxypolybutadiene is admixed with a vinylbenzene. In casting and encapsulating applications, epoxypolybutadienes are generally cured with a curing system composed of a vinylbenzene and an unsaturated dicarboxylic anhydride, or a vinylbenzene, an unsaturated dicarboxylic anhydride, and a polyhydric alcohol. For example, a typical curing system would be a mixture of styrene, maleic anhydride, and propylene glycol. These curing systems are taught in the copending application of Reich, Nowlin, and Heiberger, Serial No. 3,714, filed January 21, 1960, now U.S. Patent 3,092,608.

When an epoxypolybutadiene is to be cured with one of these systems, it is desirable to blend the epoxypolybutadiene with the vinylbenzene, and thereafter handle the resin as a preformed mixture. This mixture may then be readily cured at any desired time by blending it with an unsaturated dicarboxylic anhydride and heating the blend to the curing temperature. However, preformed mixtures containing an epoxypolybutadiene and a vinylbenzene in many cases have a relatively short shelf-life; in some cases it may be less than a day in length. Moreover, when an anhydride is added to these mixtures, the resulting system may have an extremely short pot-life. Furthermore, the thermoset resins formed by curing these preformed mixtures are generally not clear, but have a cloudy appearance, as well as having impaired strength and thermal properties.

It is an object of this invention to stabilize epoxypolybutadienes.

Another object is to increase the pot-life of epoxypolybutadienes which have been warmed to facilitate blending.

Another object is to increase the shelf-life of mixtures containing an epoxypolybutadiene and a vinylbenzene.

Still another object is to produce epoxypolybutadienes which can be cured with a vinylbenzene and an anhydride to form homogeneous, clear resins having improved strength and thermal properties.

These and other objects will become apparent from the following description of this invention.

It has now been discovered that epoxypolybutadienes can be effectively stabilized by heating them in the presence of at least 0.01 part by weight of hydroquinone per 100 parts of epoxypolybutadiene at a temperature of at least 40° C. for a period of at least 10 minutes. Epoxypolybutadienes treated in this manner have an extremely long shelf-life, even in admixture with vinylbenzenes, while the pot-life of epoxypolybutadienes mixed with curing agents may be more than doubled by this treatment. Moreover, no unduly long induction period is experienced upon curing epoxypolybutadienes treated in this manner. More important however, epoxypolybutadienes treated in accordance with this invention can be cured to homogeneous, clear products having much improved strength and thermal properties as compared with similar epoxypolybutadienes not similarly treated.

Although the exact nature of the instability of epoxypolybutadienes is not fully understood, it is believed that it is caused by the presence of peroxygen groups within the chemical structure of the epoxypolybutadienes. These peroxygen groups are introduced during the epoxidation of the polybutadiene and are quite different from added peroxygen chemicals such as hydrogen peroxide, benzoyl peroxide, and peroxides formed by autooxidation of such materials as styrene. Although the invention is not limited to any particular mechanism, it is believed that by heating unstable epoxypolybutadienes as taught herein, these structurally bound peroxygen groups are freed and inactivated by reaction with the hydroquinone. This theory is supported by the fact that neither the heat treatment alone, nor the addition of hydroquinone alone, gives the desired result.

The stabilization treatment of this invention is carried out by heating the epoxypolybutadiene in the presence of hydroquinone at a temperature of at least about 40° C. At temperatures below about 40° C., no significant reduction in the bound peroxygen content in accomplished. Any temperature above 40° C. is suitable, however temperatures above about 150° C. give no particular advantage. Preferably the treatment is carried out at temperatures in the range of about 70°–130° C.

The quantity of hydroquinone employed should be at least about 0.01 part by weight per 100 parts of resin, however the exact amount required will vary depending upon the amount of peroxygen present in the epoxypolybutadiene. The use of more than about 0.5 part of hydroquinone should be avoided, since excesses may give rise to lengthened induction periods during the curing of the resin. Preferably from about 0.05–0.3 part of hydroquinone per 100 parts of resin is added.

The duration of the treatment should generally be at least about 10 minutes; however, the time will vary depending upon the amount of peroxygen present and the temperature employed. Preferably the treatment is carried out for a period of about 30 minutes to 2 hours. Longer periods of heating have no detrimental effect upon the product.

Although it is not critical that the hydroquinone be added during or immediately before the heat treatment, unnecessary delays between the addition of the hydroquinone and the heat treatment should be avoided. If a long period of time is allowed to lapse, some or all of the hydroquinone may be dissipated, and thus not be present at the time of the heat treatment in the amounts necessary to achieve the desired stabilization.

A solvent for the hydroquinone may be employed with viscous epoxypolybutadienes, although good results are obtained in most cases by mixing the hydroquinone directly with the epoxypolybutadiene. If a solvent is employed, the hydroquinone is first dissolved in a convenient quantity of the solvent, and then mixed with the epoxypolybutadiene. Any of the liquid solvents for hydroquinone, for example alcohols such as methyl, ethyl, propyl, butyl, and amyl; ketones such as acetone, methylethyl, methylpropyl, methylisobutyl, diethyl, and ethylisopropyl; ethers such as methylpropyl, methylbutyl, methylamyl, diethyl, ethylpropyl, ethylbutyl, ethylamyl, and dipropyl, and many others may be used.

The epoxypolybutadienes which may be stabilized by the process taught herein are prepared by polymerizing butadiene and epoxidizing the polybutadiene product. The polymerization of butadiene may be carried out in any well known manner, such as emulsion or solution polymerization using a variety of catalysts, including free radical, alkali metal, Friedel-Crafts, and organo-metallic catalysts. Preferably the polymerization is carried out in the presence of a solvent with sodium as the catalyst.

Although any polybutadiene may be epoxidized to epoxypolybutadiene, best results are generally obtained with liquid polymers having a number average molecular weight below about 2500, corresponding to a viscosity below about 50 poises measured at 25° C. and extrapolated to zero-shear, since higher polymers are very viscous when epoxidized to a high epoxy content and thus are not easily worked. When epoxidized to a lower epoxy content, higher molecular weight polymers may of course be used, and at epoxy contents as low as about 1 or 2%, polybutadienes having a molecular weight of about 10,000 and higher may be used. The lower limit of the molecular weight range for these polymers is about 100; that is, mixtures of dimers and trimers could actually be used, should they be desired to impart particular properties for special applications. In general, a convenient and preferred molecular weight range for the polybutadienes is in the range of about 250 to 5000. Polymers outside of the molecular weight ranges described may also be used, but in the high molecular weight ranges and for solid polymers, it is generally necessary to dissolve the polymer in a solvent before carrying out the epoxidation. Useful techniques for the polymerization of butadiene are described in U.S. Patents 2,631,175 and 2,791,618.

For the epoxidation of the polybutadienes, standard epoxidation techniques may be used. Aliphatic, aromatic, and inorganic peracids, salts of peracids, peroxides, and hydroperoxides are the most common of the effective epoxidizing agents. For convenience, lower aliphatic peracids, such as performic, peracetic, perpropionic and perbutyric are preferred reagents. With these reagents, the epoxidation reaction may be carried out using a preformed peracid mixture, or the peracid may be formed in the reaction medium generally by adding hydrogen peroxide to an aliphatic acid or anhydride medium. Peracids may be prepared in any known way, such as is described in Organic Synthesis, Reinhold Publishing Corp. (1957), page 302. A number of epoxidation techniques for polybutadiene are illustrated in U.S. Patent 2,826,556 to F. P. Greenspan and A. E. Pepe.

The epoxidation may be conducted using stoichiometric amounts of the peracid: that is, one mole of peracid per double bond in the polymer; or amounts below that theoretically required may be used. There is no significant advantage to using excess oxidant and, although the reactivity and properties of the epoxidized polybutadienes do vary with the degree of oxidation it has been found that the use of as little as 5% of the theoretical amount of peracid will produce useful resins. In general, the epoxidized polybutadienes contain at least 1% by weight of epoxy oxygen, and it is preferred for most applications to employ epoxypolybutadienes having about 4 to 10% epoxy oxygen by weight. Epoxypolybutadienes containing more than 10% epoxy oxygen tend to be extremely viscous, especially in the higher molecular weight range; but this may actually be desired for special applications, such as coatings.

Preferably the epoxidation is carried out by the in situ formation of peracetic acid whereby the polybutadiene is reacted with acetic acid and hydrogen peroxide in the presence of an ion exchange resin and a solvent. The solvent may be any low-boiling solvent for the epoxypolybutadiene product, such as benzene or toluene. When the reaction is complete, the epoxidation product is allowed to separate into an aqueous phase and a solvent phase. The solvent phase containing the epoxypolybutadiene generally has a peroxygen content of about 1000 parts by weight per million parts of epoxypolybutadiene, as measured by the ferrous thiocyanate method described in Analytical Chemistry, vol. 23, pages 595–603, 1951. The solvent is removed from the resin product by vacuum stripping.

In order to achieve the desired degree of stability by the instant process, the peroxygen content of the epoxypolybutadiene should be reduced to less than 100 parts per million, and preferably below 50 parts per million. The hydroquinone treatment of this invention not only reduces the initially high peroxygen content of the epoxypolybutadiene to an acceptable level, but also stabilizes the epoxypolybutadiene against the future build-up of additional peroxygen by autooxidation.

Although any epoxypolybutadiene may be treated in accordance with this invention, it is preferable to treat freshly prepared epoxypolybutadiene. Since the high peroxygen content of untreated epoxypolybutadiene promotes the further build-up of peroxygen, freshly prepared epoxypolybutadiene should be protected with a blanket of oxygen-free gas such as nitrogen, or in some other way protected until the high peroxygen content has been reduced. An especially suitable method for reducing the peroxygen content of freshly prepared epoxypolybutadienes is to add the hydroquinone to the crude epoxypolybutadiene just prior to, or during, the step of removing the solvent by vacuum stripping. This stripping step provides the temperature which is necessary for the hydroquinone treatment, and also provides agitation which aids in mixing the hydroquinone with the epoxypolybutadiene.

The improved epoxypolybutadienes of this invention are cured in the same manner as conventional epoxypolybutadienes, by reaction with epoxy curing agents. Illustrative examples of epoxy curing agents include aliphatic and aromatic amines such as triethylenetetramine and meta-phenylenediamine; anhydrides such as maleic, phthalic, hexahydrophthalic, tetrahydrophthalic, and pyromellitic; anhydride-glycol mixtures containing glycols such as ethylene, diethylene, propylene, and dipropylene; dicarboxylic acids such as fumaric, maleic, phthalic, itaconic, malic, succinic, and pyromellitic; dihydroxyphenols such as resorcinol, catechol, and 2,2-bis(4-hydroxyphenyl)propane; amino acids such as para-aminobenzoic and others. Vinylbenzenes may also be added with the above curing agents to react with the unsaturation contained in epoxypolybutadienes.

The following examples, illustrating the novel stabilization process taught herein and the beneficial results flowing therefrom, are presented without any intention that the invention be limited thereto. All parts and percentages are by weight.

*Example I*

Butadiene was polymerized as follows: About 4.3 parts of sodium as a 46% dispersion in kerosene and 162 parts of benzene were charged to an agitated reactor, the temperature was raised to 90° C., and 3.0 parts of technical grade butadiene was added. The temperature was maintained at about 85° C. while 97 parts of butadiene and 20 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was liquid polybutadiene, having an iodine number of 383, viscosity of 16.4 poises at 25° C. extrapolated to zero shear, and number average molecular weight of 980.

This polybutadiene was epoxidized as follows: About 100 parts of liquid polybutadiene, 100 parts of toluene, 31.6 parts of Dowex resin 50 X–12 (a sulfonated styrene-divinylbenzene polymer cross-linked with 12% divinylbenzene) and 16.2 parts of glacial acetic acid were heated with agitation to 60° C. About 70 parts of 50% hydrogen peroxide was then added over a period of 3 hours. The temperature was maintained at 60° C. for an additional 4 hours, the mixture was cooled to 30° C., mixed with 123 parts of toluene and 26 parts of soda ash, and allowed to settle. The oily layer was separated and filtered. The filtrate was heated to 80° C. to remove the water azeotropically, leaving a 40% solution of epoxypolybutadiene in toluene, having a peroxygen content of 1050 parts per million parts of resin.

To this solution 0.1 part of hydroquinone per 100 parts of epoxypolybutadiene was added, and the toluene was removed by vacuum stripping at a temperature of 110° C. and a pressure of 5 mm. Hg. After 1 hour the toluene was completely removed, and the concentrated epoxypolybutadiene had an epoxy oxygen content of 8.98%, a viscosity of 1685 poises at 25° C. extrapolated to zero shear, and a peroxygen content of 75 parts per million. A portion of this stabilized epoxypolybutadiene was subjected to a temperature of 80° C. for a period of 6 weeks without any increase in viscosity. Another portion was mixed with 30 parts per hundred of sytrene, and subjected to a temperature of 80° C. After a total of 62 hours the resin remained viscosity stable.

The above example was repeated except that the hydroquinone was omitted. A portion of stripped resin having a peroxygen content of 1050 parts per million was subjected to a temperature of 80° C. for 1 week, after which the viscosity approximately tripled. Another portion was mixed with 30 parts per hundred of styrene. The resin gelled after 2 hours at room temperature.

The above example was again repeated omitting the addition of hydroquinone prior to the stripping step. To a portion of this resin were added 30 parts per hundred of styrene and 0.1 part per hundred of hydroquinone, and the resin was held at room temperature for four weeks during which period the hydroquinone was substantially dissipated. It was then subjected to a temperature of 80° C. with the result that the resin increased in viscosity from 17 to 110 poises after 4 hours, and gelled after 8 hours. Stability was not achieved because of the lapse of time between the addition of the hydroquinone and the raising of the temperature.

*Example II*

A series of epoxypolybutadienes were prepared by epoxidizing the polybutadiene prepared in Example I as follows: About 100 parts of liquid polybutadiene, 100 parts of benzene, 15 parts of Dowex resin 50 X–12 (a sulfonated styrene-divinylbenzene polymer cross-linked with 12% divinylbenzene) and 8.5 parts of glacial acetic acid were heated with agitation to 60° C. About 35 parts of 50% hydrogen peroxide was then added over a period of 1.5 hours. The temperature was maintained at 60° C. for an additional 2.0 hours, the mixture was cooled to 30° C., mixed with 80 parts of benzene and 13 parts of soda ash, and allowed to settle. The oily layer was separated and filtered. The filtrate was heated to 80° C. to remove the water azeotropically leaving a 35% solution of epoxypolybutadiene in benzene. The samples of epoxypolybutadiene had epoxy oxygen contents varying between 3.7 and 4.1.

One portion of each of the samples was vacuum stripped by heating at 80° C. and 5 mm. Hg, in the presence of 0.1 part of hydroquinone per hundred parts of resin. Another portion of each of the samples was vacuum stripped by heating at 80° C. and 5 mm. Hg without the addition of hydroquinone. The peroxygen content of each of the samples was measured by the ferrous thiocyanate method and found to be as follows:

| Sample | Peroxygen Content, Parts per Million | |
|---|---|---|
| | Resin Stripped without Hydroquinone | Resin Stripped with Hydroquinone |
| A | 845 | 35 |
| B | 1,100 | 78 |
| C | 185 | 9 |
| D | 1,415 | 101 |
| E | 959 | 72 |

The stability of each of the resins stripped with hydroquinone was improved over that of the corresponding resin stripped without hydroquinone.

*Example III*

An epoxypolybutadiene was prepared in the manner described in Example I and stripped in the absence of hydroquinone. To 100 parts of this epoxypolybutadiene were added 0.20 part of hydroquinone in 4 parts of acetone, 30 parts of styrene, and 10 parts of 2,3-butylene glycol. The mixture was warmed to 40° C., and 32 parts of maleic anhydride were added to the mixture. After cooling to room temperature, 0.4 part of benzoyl peroxide was added. The mixture was poured into an aluminum boat mold and cured 2 hours at 40° C. and 4 hours at 115° C. The casting had a flexural strength of 12,000 p.s.i. After a postcure of 1 hour at 115° C. and 24 hours at 155° C., the flexural strength was 11,500 p.s.i.

The above example was repeated except that the hydroquinone was omitted. The casting had a flexural strength of of 12,000 p.s.i before postcuring, and a flexural strength of 7,800 p.s.i. after postcuring.

*Example IV*

An epoxypolybutadiene was prepared in the manner described in Example I and stripped in the absence of hydroquinone. To 100 parts of this epoxybutadiene were added 0.20 part of hydroquinone in 4 parts of acetone. The mixture was heated in a vacuum oven for two hours at 60° C. To 25 parts of this resin were added 0.10 part of benzoyl peroxide, 7.5 parts styrene, and 2.4 parts of 2,3-butylene glycol. The mixture was warmed to 35° C. and 7.7 parts of maleic anhydride were added. After two hours at 60° C. and 24 hours at 155° C., the casting had a heat distortion temperature of 117° C. After an 8-day water-boil test, the heat distortion temperature was 105° C.

The above example was repeated except that the hydroquinone and acetone were omitted. The heat distortion temperature before the water-boil test was 89° C., and after the test it was 82° C.

While the stabilization treatment of this invention has been explained and exemplified in such manner that one skilled in the art can readily understand and practice the invention, numerous modifications and variations of the specific embodiments described above may be made without departing from the spirit of the invention or the scope of the following claims.

We claim:
1. A method of stabilizing an epoxypolybutadiene which comprises heating an epoxybutadiene obtained by epoxidizing a polybutadiene having a number average molecular weight of 100–10,000, said epoxybutadiene having an epoxy oxygen content of at least 1% by weight, in the presence of 0.01–0.5 part by weight of hydroquinone per 100 parts of epoxypolybutadiene at a temperature of at least 40° C. for a period of at least 10 minutes, and recovering epoxypolybutadiene having a reduced peroxygen content.

2. The method of claim 1 in which the epoxypolybutadiene is heated in the presence of 0.05–0.3 part by weight of hydroquinone per 100 parts of epoxypolybutadiene at a temperature in the range of 70–130° C. for a period of 30 minutes to 2 hours.

3. A method of stabilizing epoxypolybutadiene which comprises vacuum stripping an epoxypolybutadiene reaction product mixture containing an epoxypolybutadiene obtained by epoxidizing a polybutadiene having a number average molecular weight of 100–10,000, said epoxypolybutadiene having an epoxy oxygen content of at least 1%, dissolved in a low-boiling solvent in the presence of 0.01–0.5 part by weight of hydroquinone per 100 parts of epoxypolybutadiene at a temperature of at least 40° C. for a period of at least 10 minutes thereby removing said solvent, and recovering epoxypolybutadiene having a reduced peroxygen content.

4. The method of claim 3 in which the epoxypolybutadiene reaction product mixture is vacuum stripped in the presence of 0.05–0.3 part by weight of hydroquinone per 100 parts of epoxypolybutadiene at a temperature in the range of 70–130° C. for a period of 30 minutes to 2 hours.

References Cited in the file of this patent

UNITED STATES PATENTS

| | | |
|---|---|---|
| 2,706,189 | Pruitt et al. | Apr. 12, 1955 |
| 2,791,530 | Dallavis et al. | May 7, 1957 |
| 2,851,441 | Greenspan et al. | Sept. 9, 1958 |
| 2,914,540 | Goddu et al. | Nov. 24, 1959 |
| 3,057,820 | Bell et al. | Oct. 9, 1962 |

OTHER REFERENCES

Bakshi: Chem. Abst., vol. 46, Col. 687–8 (1 pg.) (1952).

Bickford et al.: Chem. Abst., vol. 48, Col. 5526 (1954).

Ermolenko et al.: Chem. Abstr., vol. 51, Col. 18672 (1957).

Lippincott et al.: J. Am. Chem. Soc., vol. 79, pages 4811 to 4812 (1957).

UNITED STATES PATENT OFFICE

CERTIFICATE OF CORRECTION

Patent No. 3,133,092　　　　　　　　　　May 12, 1964

Gene Nowlin et al.

It is hereby certified that error appears in the above numbered patent requiring correction and that the said Letters Patent should read as corrected below.

Column 2, line 41, for "in", second occurrence, read -- is --; column 6, lines 45, 69, and 71, for "epoxybutadiene", each occurrence, read -- epoxypolybutadiene --.

Signed and sealed this 29th day of September 1964.

(SEAL)
Attest:

ERNEST W. SWIDER
Attesting Officer

EDWARD J. BRENNER
Commissioner of Patents